United States Patent

Madrazo et al.

[15] 3,699,355

[45] Oct. 17, 1972

[54] GATE CIRCUIT

[72] Inventors: Charles Felix Madrazo, North Palm Beach; Edwin Maxwell Fulcher; Kevin Patrick McDonagh, both of Lake Park, all of Fla.

[73] Assignee: RCA Corporation

[22] Filed: March 2, 1971

[21] Appl. No.: 120,268

[52] U.S. Cl. ..................307/215, 307/218, 307/237, 307/254, 307/299

[51] Int. Cl. ..........................................H03k 19/34

[58] Field of Search...307/299 A, 215, 218, 254, 237

[56] References Cited

UNITED STATES PATENTS

| | | | |
|---|---|---|---|
| 3,581,107 | 5/1971 | Nielsen | 307/215 |
| 3,491,251 | 1/1970 | Witsell | 307/215 |
| 3,562,549 | 2/1971 | Teichmann | 307/215 |
| 3,560,761 | 2/1971 | Kardash | 307/215 |
| 3,571,616 | 3/1971 | Andrews | 307/215 |
| 3,445,680 | 5/1969 | Foster | 307/215 |

*Primary Examiner*—Stanley T. Krawczewicz
*Attorney*—H. Christoffersen

[57] ABSTRACT

Gating circuit having a feedback network which provides output voltage clamping and medium to high speed operation. In addition, the feedback network provides transient overdrive which reduces output signal falltime.

13 Claims, 1 Drawing Figure

PATENTED OCT 17 1972 3,699,355
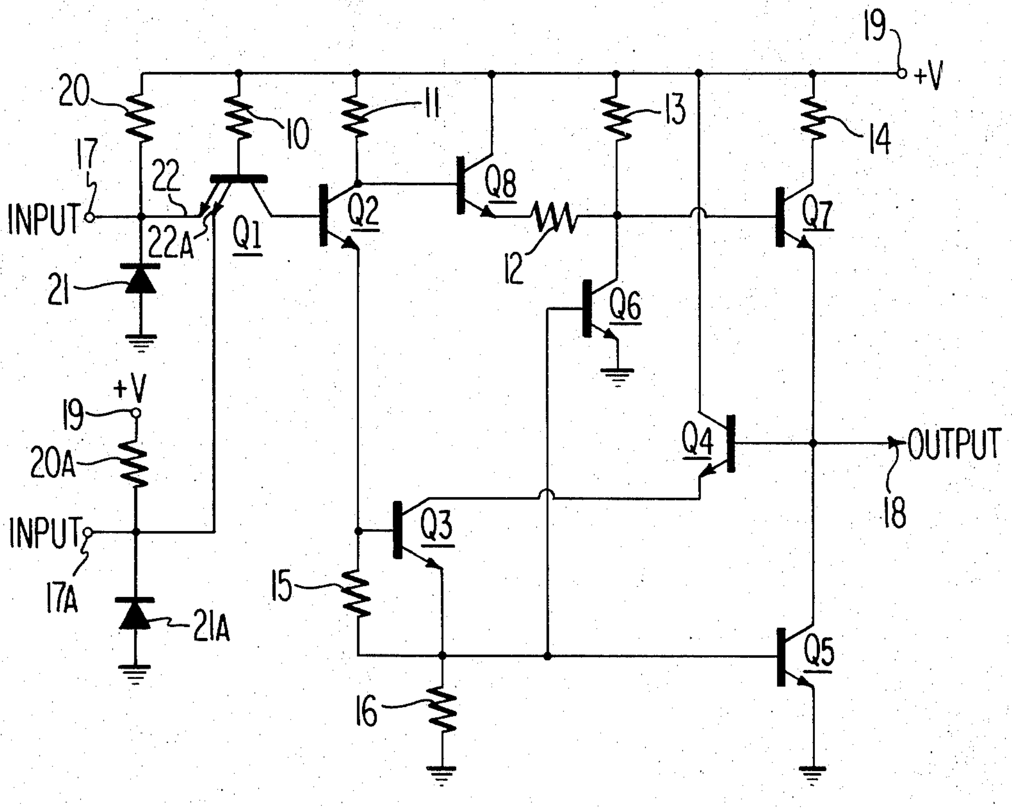
INVENTORS
Charles F. Madrazo,
Kevin P. McDonagh,
and Edwin M. Fulcher.
BY
G. Donald Weber Jr.
ATTORNEY

GATE CIRCUIT

BACKGROUND OF THE INVENTION

In the so-called $T^2L$ technology, a number of different circuit configurations have been used to achieve higher noise immunity. In most of these circuits, the input threshold is increased by one diode voltage drop. However, these circuits have problems in adjusting the speed thereof to operate properly with other $T^2L$ circuits. In addition, most of the circuits utilizing the techniques described supra do not include a provision either for (a) clamping high level overshoots in the output signal caused by transmission line effects or (b) noise immunity to transient feedback effects.

SUMMARY OF THE INVENTION

A circuit which embodies the instant invention includes a feedback network and a network which produces high noise immunity. As well, these networks interact to improve circuit operating speed. The feedback network also serves to clamp the output voltage. This circuit, therefore, produces a speedup in operation with high noise immunity as well as a reduction in high level ringing problems at the output thereof.

BRIEF DESCRIPTION OF THE DRAWING

The single FIGURE is a schematic diagram of the preferred embodiment of the instant invention.

DESCRIPTION OF THE PREFERRED EMBODIMENTS

In the embodiment shown, a plurality of input terminals 17 and 17A are connected to plural emitters 22 and 22A of NPN transistor Q1. The input terminals are connected to ground via clamping diodes 21 and 21A. Diodes 21 and 21A are connected in such a way that input terminals 17 and 17A, respectively, are clamped to approximately ground (ignoring diode drops) in the presence of a relatively negative input signal. In addition, input terminals 17 and 17A are connected to the source +V at terminal 19 via resistors 20 and 20A, respectively. Resistors 20 and 20A are pull-up resistors which maintain input terminals 17 and 17A at approximately the +V level in the absence of an input signal at the input terminal. By utilizing the pull-up resistors, it is not essential to connect input terminals of a multi-emitter transistor which are not connected to output terminals of a driving device. The base electrode of transistor Q1 is also connected to terminal 19 via resistor 10 which affects the current through transistors Q1 and Q2 inasmuch as the base of transistor Q2 is connected to the collector of transistor Q1.

The collector of transistor Q2 is connected to terminal 19 via resistor 11 which also affects the current through transistor Q2 as well as the turn-off time thereof. The emitter of NPN transistor Q2 is connected to ground via the network comprising resistors 15 and 16 connected in series. In addition, the base of NPN transistor Q3 is connected to the emitter of transistor Q2. The emitter of transistor Q3 is connected to the common junction of series-connected resistors 15 and 16. Furthermore, the emitter of transistor Q3 is connected to the base of lower output stage transistor Q5. The emitter of NPN transistor Q5 is connected to ground. The collector of transistor Q5 is connected to output terminal 18. In addition, the collector of transistor Q5 is connected to the base of feedback transistor Q4. The emitter electrode of NPN transistor Q4 is returned to the collector electrode of transistor Q3. The collector of transistor Q4 is connected to terminal 19.

The base of coupling transistor Q8 is connected to the collector electrode of transistor Q2 while the collector of transistor Q8 is connected to terminal 19. The emitter of transistor Q8 is connected via resistor 12 to the base of transistor Q7, the upper output stage transistor. The collector of transistor Q7 is connected to terminal 19 via resistor 14 while the emitter of transistor Q7 is connected to output terminal 18. Resistor 13 is connected from terminal 19 to the base of transistor Q7 and operates as a bias network for transistor Q7. The collector of transistor Q6 is connected to the base of transistor Q7 while the emitter of transistor Q6 is connected to ground. The base of transistor Q6 is connected to the common junction at the emitter of transistor Q3. Resistor 13 also operates as a load resistor for transistor Q6.

In operation, it is initially assumed that the signals supplied to input terminals 17 and 17A (which represent two of N input terminals) are high level signals. These high level signals essentially reverse bias the base-emitter diodes of transistor Q1. However, through the collector-base junction in transistor Q1, transistor Q2 is rendered conductive. When transistor Q2 is conductive, a relatively positive signal is supplied at the base of transistor Q3 wherein this transistor is also conductive. Furthermore, the relatively positive signal is supplied at the base of transistor Q5 wherein this transistor is conductive as well. Furthermore, the current through transistor Q3 is supplied to the base of transistor Q5 thereby to provide a high current overdrive which causes transistor Q5 to turn on rapidly. As transistor Q5 is rendered conductive, the potential at output terminal 18 (i.e., the collector of transistor Q5) falls rapidly until it is essentially clamped near ground potential. Moreover, the base-emitter junction of transistor Q4 is conductive until, through operation of transistor Q5, the potential at the base of transistor Q4 causes transistor Q4 to be reverse biased. While transistor Q4 is conductive, additional current is supplied to transistor Q5 via transistor Q3. When transistor Q4 is reverse biased (and nonconductive) the collector path of transistor Q3 is interrupted and the base-emitter junction of transistor Q3 operates as a diode. Clearly, the current through transistor Q3 is decreased and the overdrive signal to transistor Q5 is removed.

When transistor Q2 is rendered conductive, transistor Q6 is also rendered conductive. When transistor Q6 is conductive, it saturates and the base of transistor Q7 is clamped essentially at ground wherein transistor Q7 is rendered effectively nonconductive. At this time, transistor Q8 is forward biased and conductive but does not affect circuit operation.

When the input signal at any one of the input terminals 17 and 17A switches to a negative level, the base-emitter junction of transistor Q1 is conductive. When transistor Q1 is conductive, transistor Q2 is rendered nonconductive. When transistor Q2 is nonconductive, the current path connected to the base of transistor Q3 is essentially interrupted. Consequently, transistor Q3 is essentially nonconductive. Also, transistors Q5 and Q6 are rendered nonconductive since the base electrodes thereof are returned to ground potential via resistor 16. However, transistor Q8 is conductive. When transistor Q6 is nonconductive, a relatively positive signal is supplied to the base of transistor Q7 via transistor Q8 whereby transistor Q7 is rendered conductive. Inasmuch as transistors Q6 and Q5 are nonconductive, the signal at output terminal 18 tends to rise toward the —V signal level. If the output signal at terminal 18 tends to overshoot (e.g., due to reflections on the output line, ringing and the like), the output signal will continue to rise until the base-collector diode of transistor Q4 is forward-biased. Thus, transistor Q4 effectively clamps the output to one diode (i.e., the base-collector diode of transistor Q4) voltage above +V, thereby minimizing the overshoot on the output signal.

Transistor Q3, in addition to operating in the feedback network, provides an additional low level noise immunity threshold approximately equal to the diode voltage drop of the base-emitter junction of transistor Q3. That is, the threshold voltage for the circuit shown in the sole figure includes the offset voltage of transistor Q1 and the $V_{BE}$ drops of transistors Q2, Q3 and Q5.

By proper utilization and selection of resistors 15 and 16, the turn-off time for transistors Q3, Q5 and Q6 can be optimized. That is, these transistors can be turned off as rapidly as possible in response to the turning off of transistor Q2. However, it must be understood that the resistance of these resistors cannot be made too low inasmuch as an excessive drive current would be inserted into the system relative to transistors Q5 and Q6.

In addition, as noted supra, resistor 11 functions to control the current through transistor Q2. Thus, resistor 11, in conjunction with the internal capacitance of the transistors, controls the turn-off time of transistor Q2. This condition obviously affects the operation of transistor Q8. Inclusion of transistor Q8 in the circuit permits resistor 13 to be relatively high in impedance which provides improved speed-power product of the circuit by permitting lower power dissipation while maintaining the same speed. That is, transistor Q8 and resistor 12 form a power saving network by allowing resistor 13 to have a high impedance while transistor Q8 and resistor 12 provide a low impedance to the base of transistor Q7.

Having thus described the instant invention, it is obvious that a circuit having increased noise immunity, better control of the output signal and better operating conditions in high speed circuitry, is provided. It will become apparent to those skilled in the art that certain modifications can be made to the instant circuit, as for example, changing the polarity of the semiconductors and the like. Moreover, while the circuit has been discussed in terms of bipolar transistors, it should be understood that this circuit can be utilized in many other semiconductor technologies. The type of semiconductors suggested is for illustrative purposes only and is not intended to be limitative of the invention.

What is claimed is:

1. A circuit comprising input means, output means, first semiconductor means having a conduction path and a control electrode for controlling conduction through said conduction path, said control electrode connected to said input means, and a first end of said conduction path connected to said output means to provide increased noise immunity of said circuit, second semiconductor means having a conduction path and a control electrode for controlling conduction through said conduction path, said control electrode connected to the first end of said conduction path of said first semiconductor means and said conduction path of said second semiconductor means connected to said output means to control said output means in accordance with the condition of said first semiconductor means, coupling means connected from said input means to said output means, said conduction path of said second semiconductor means connected to said coupling means to couple said input means to said output means as a function of the condition of said second semiconductor means, and feedback means connected from said output means to the second end of said conduction path of said first semi-conductor means, said feedback means selectively supplying a signal from said output means to said first semiconductor means for causing said first semiconductor means to control the operation of said output means.

2. The circuit recited in Claim 1 wherein said feedback means comprises third semiconductor means having a conduction path and a control electrode for controlling conduction in said conduction path, source means, said conduction path of said third semiconductor means connected between said source means and the second end of said conduction path of said first semiconductor means, and said control electrode of said third semiconductor means connected to said output means.

3. The circuit recited in claim 1 wherein said input means includes gating means including a third semiconductor means having a conduction path and a control electrode for controlling the conduction in said conduction path, source means connected to the control electrode, means for receiving a plurality of input signals connected to a first end of said conduction path, and means for coupling the second end of said conduction path to said first semiconductor means and said coupling means, said gating means producing a signal in accordance with the condition of said input signal, and clamp means connected to said gating means to supply predetermined signals thereto in the absence of input signals.

4. The combination comprising an input terminal, first and second circuit points, a first semiconductor means having first and second electrodes, and having a control electrode coupled to said input terminal, a second semiconductor means having a control electrode coupled to the first electrode of said first semiconductor means, a first electrode coupled to the first circuit point, and a second electrode coupled to the second circuit point, and a third semiconductor means having a control electrode coupled to the second electrode of said second semiconductor means, a first electrode coupled to the second electrode of said first semiconductor means, and a second electrode coupled to said second circuit point.

5. The combination claimed in claim 4 and further including resistive means connected between the first electrode of said first semiconductor means and said first circuit point, and an output terminal connected to the second electrode of said second semiconductor means.

6. The combination claimed in claim 4 wherein the first electrode of each of the first, second and third semiconductor means is an emitter electrode, and wherein the second electrode of each of said semiconductor means is a collector electrode.

7. The combination claimed in claim 4 including a fourth semiconductor means having a control electrode coupled to said input terminal and having first and second electrodes which define the ends of a conduction path through the fourth semiconductor means, wherein the coupling of the second electrode of said second semiconductor means to said second circuit point is by way of said conduction path.

8. In combination, a plurality of semiconductor devices each of which includes a conduction path having first and second terminals and a control terminal for controlling conduction through said conduction path, an input terminal, source means having first and second terminals, said input terminal connected to the control terminal of a first one of said semiconductor devices, the first terminal of said first semiconductor device connected to the control terminal of a second one of said semiconductor devices and to said first terminal of said source means, the second terminal of said first semiconductor device connected to the control terminal of a third one of said semiconductor devices and to said second terminal of said source means, the first terminal of said second semiconductor device connected to said first terminal of said source means, the second terminal of said second semiconductor device connected to the first terminal of a fourth one of said semiconductor devices and to the control terminal of a fifth one of said semiconductor devices, the second terminal of said third semiconductor device connected to said second terminal of said source means and to the control terminal of a sixth one of said semiconductor devices, the control terminal of said fourth semiconductor device connected to the second terminal of said third semiconductor device, the second terminal of said fourth semiconductor device connected to said second terminal of said source means, the first terminal of said fifth semiconductor device connected to said first terminal of said source means, the second terminal of said fifth semiconductor device connected at a common junction with the fist terminal of said sixth semiconductor device, the second terminal of said sixth semiconductor device connected to said second terminal of said source means, the control terminal of a seventh one of said semiconductor devices connected to said common junction, the first terminal of said seventh semiconductor device connected to said first terminal of said source means, the second terminal of said seventh semiconductor device connected to the first terminal of said third semiconductor device, and an output terminal connected to said common junction.

9. The combination recited in claim 8 wherein each of said semiconductor devices comprises a transistor, said first and second terminals correspond to the collector and emitter electrodes of the respective transistors, and said control terminals correspond to the base electrodes of the respective transistors.

10. A circuit comprising input means, output means including a pair of semiconductor devices each having a conduction path and a control electrode for controlling the conduction in said conduction path, said conduction paths connected in series and defining an output terminal at the junction thereof, first semiconductor means connected between said input means and said control electrode of one of said semiconductor devices within said output means to provide increased noise immunity of said circuit, second semiconductor means connected from said first semiconductor means to said control electrode of said other semiconductor device within said output means to control said output means in accordance with the condition of said first semiconductor means, coupling means connected from said input means to said control electrode of said other semiconductor device within said output means and said second semiconductor means to couple said input means to said output means as a function of the condition of said second semiconductor means, and feedback means connected from said output means to said first semiconductor means, said feedback means selectively supplying a signal from said output means to said first semiconductor means for causing said first semiconductor means to control the operation of said output means.

11. The circuit recited in claim 10 wherein said feedback means comprises third semiconductor means having a conduction path and a control electrode for controlling conduction in said conduction path, source means, said conduction path of said third semiconductor means connected between said source means and said first semiconductor means, and said control electrode of said third semiconductor means connected to said output terminal.

12. The circuit recited in claim 10 wherein said input means includes gating means including a third semiconductor means having a conduction path and a control electrode for controlling the conduction in said conduction path, source means connected to the control electrode, means for receiving a plurality of input signals connected to a first end of said conduction path, and means for coupling the second end of said conduction path to said first semiconductor means and said coupling means, said gating means producing a signal in accordance with the condition of said input signal, and clamp means connected to said gating means to supply predetermined signals thereto in the absence of input signals.

13. The circuit recited in claim 10 wherein said feedback means is connected from said output terminal to said first semiconductor means to transmit a signal representative of an output signal having a magnitude greater than a prescribed level to said first semiconductor means whereby said other semiconductor of said pair of semiconductor devices causes said output signal to assume a magnitude smaller than said prescribed level.

* * * * *

Disclaimer 3,699,355.—*Charles Felix Madrazo*, North Palm Beach, and *Edwin Maxwell Fulcher* and *Kevin Patrick McDonagh*, Lake Park, Fla. GATE CIRCUIT. Patent dated Oct. 17, 1972. Disclaimer filed Apr. 14, 1977, by the assignee, *RCA Corporation.*

Hereby enters this disclaimer to claims 4, 5 and 6 of said patent.

[*Official Gazette July 12, 1977.*]